United States Patent
Qiu et al.

(10) Patent No.: US 7,453,250 B2
(45) Date of Patent: Nov. 18, 2008

(54) PWM CONTROLLER WITH DUAL-EDGE MODULATION USING DUAL RAMPS

(75) Inventors: Weihong Qiu, San Jose, CA (US); Zhixiang Liang, Portland, OR (US); Robert H. Isham, Flemington, NJ (US); Ben A. Dowlat, San Jose, CA (US); Rami Abou-Hamze, Los Gatos, CA (US)

(73) Assignee: Intersil Americas Inc., Milpitas, CA (US)

( * ) Notice: Subject to any disclaimer, the term of this patent is extended or adjusted under 35 U.S.C. 154(b) by 518 days.

(21) Appl. No.: 11/318,081

(22) Filed: Dec. 23, 2005

(65) Prior Publication Data
US 2007/0013356 A1   Jan. 18, 2007

Related U.S. Application Data

(60) Provisional application No. 60/696,680, filed on Jul. 5, 2005, provisional application No. 60/651,599, filed on Feb. 10, 2005.

(51) Int. Cl.
*G05F 1/00* (2006.01)
(52) U.S. Cl. .................. 323/288; 323/282; 332/109

(58) Field of Classification Search ......... 323/220–226, 323/234, 265, 282, 288; 332/109–111
See application file for complete search history.

(56) References Cited

U.S. PATENT DOCUMENTS 6,057,675 A  *  5/2000  Tateishi ................. 323/283

* cited by examiner

*Primary Examiner*—David Mis
(74) *Attorney, Agent, or Firm*—Gary R Stanford (57) ABSTRACT

A dual-edge modulation controller including first and second ramp circuits, first and second comparators, an error amplifier and pulse control logic. The first ramp circuit provides a leading-edge ramp synchronous with a clock. The error amplifier compares a feedback signal with a reference and provides a compensation signal. The first comparator compares the leading-edge ramp with the compensation signal and asserts a set signal. The second ramp circuit provides a trailing-edge ramp that begins ramping when the set signal is asserted. The second comparator compares the trailing-edge ramp with the compensation signal and asserts a reset signal. The pulse control logic asserts a PWM signal when the set signal is asserted and de-asserts the PWM signal when the reset signal is asserted. The controller may control multiple phases with current balancing. The slew rate of the ramps may be adjusted based on the number of PWM signal asserted.

24 Claims, 8 Drawing Sheets

FIG. 1 Conventional Leading-Edge Modulation Scheme (PRIOR ART)

FIG. 2 Conventional Trailing-Edge Modulation Scheme (PRIOR ART)

FIG. 3 Conventional Dual-Edge Modulation Scheme (PRIOR ART)

FIG. 4 Dual Ramp Modulation Scheme

FIG. 10 Dual Ramp Modulation Scheme (Two Phase With Up Ramp Adjust)

PWM CONTROLLER WITH DUAL-EDGE MODULATION USING DUAL RAMPS

CROSS-REFERENCE TO RELATED APPLICATIONS

This application claims the benefit of U.S. Provisional Application Ser. No. 60/651,599, filed on Feb. 10, 2005, and U.S. Provisional Application Ser. No. 60/696,680, filed on Jul. 5, 2005, which are both herein incorporated by reference for all intents and purposes.

BACKGROUND OF THE INVENTION

1. Field of the Invention

The present invention relates to power regulators or converters, and more particularly to a power controller implemented with dual-edge modulation using dual ramp signals for fast response.

2. Description of the Related Art

The load current of a modern central processing unit (CPU) is highly dynamic and changes very quickly from low to high and from high to low. A CPU current transient may occur within 1 microsecond (μs), for example, which is less than the typical switching period of conventional voltage regulators. It is desired to provide a DC-DC power regulator with a control loop that has sufficient response time to fast load transitions whenever they occur.

In the conventional pulse-width modulation (PWM) scheme, the compensation (COMP) output of the error amplifier is typically compared to a fixed ramp signal by a PWM comparator, which generates a PWM signal used to control switching of a DC-DC power regulator. To provide switching noise immunity, a reset-set (R-S) flip-flop is often coupled to the output of the comparator to ensure that there is only one pulse for each switching cycle. A leading-edge modulation scheme is good for the load-adding transient event but not always responsive to a load-releasing transient, while a trailing-edge modulation scheme is good for the load-releasing transient event but not always responsive to a load-adding transient event. Each of these conventional schemes, therefore, insert clock signal delays under certain load varying situations. The conventional dual-edge modulation scheme also exhibits turn-on or turn-off delays since the ramp is fixed and since the leading-edge of the PWM pulse occurs only in the first half cycle while the trailing-edge only occurs in the second half cycle.

SUMMARY OF THE INVENTION

A dual-edge modulation controller according to an embodiment of the present invention includes first and second ramp circuits, first and second comparators, an error amplifier and pulse control logic. The first ramp circuit provides a leading-edge ramp signal synchronous with a clock signal. The error amplifier compares a feedback signal with a reference signal and provides a compensation signal indicative thereof. The first comparator compares the leading-edge ramp signal with the compensation signal and asserts a set signal indicative thereof. The second ramp circuit provides a trailing-edge ramp signal that begins ramping when the set signal is asserted. The second comparator compares the trailing-edge ramp signal with the compensation signal and asserts a reset signal indicative thereof. The pulse control logic asserts a pulse-width modulation (PWM) signal when the set signal is asserted and de-asserts the PWM signal when the reset signal is asserted.

The first ramp circuit may ramp the leading-edge ramp signal from a predetermined voltage level beginning with each pulse of the clock signal. The second ramp circuit may ramp the trailing-edge ramp signal from a predetermined voltage level beginning when the PWM signal is asserted and may reset the trailing-edge ramp signal back to the first voltage level when the PWM signal is de-asserted. In a more specific embodiment, the first ramp circuit is a down ramp generator and the second ramp circuit is an up ramp generator. The pulse control logic may be implemented as an R-S flip-flop or the like.

In one embodiment, the PWM signal controls a switching circuit which is coupled to an output inductor at a phase node to convert an input voltage to an output voltage through the output inductor. The second ramp circuit may control the slew rate of the trailing-edge ramp signal based on any combination of the input voltage, phase node voltage, voltage across the output inductor, and current through the output inductor.

A power converter according to an embodiment of the present invention includes a first phase circuit and a dual-edge modulation controller. The dual-edge modulation controller includes an error amplifier, an oscillator, first and second comparators, a first ramp circuit and first pulse control logic. The first phase circuit is controlled by a first PWM signal for converting an input voltage to an output voltage via a first inductor. The dual-edge modulation controller has a feedback input for sensing the output voltage and a first PWM output for providing the first PWM signal. The error amplifier has a first input coupled to the feedback input, a second input receiving a reference voltage, and an output providing a compensation signal. The oscillator provides a first leading-edge ramp signal having repetitive ramps. The first comparator compares the first leading-edge ramp signal with the compensation signal and asserts a first set signal indicative thereof. The first ramp circuit ramps a first trailing-edge ramp signal while the first PWM signal is asserted. The second comparator compares the first trailing-edge ramp signal with the compensation signal and which asserts a first reset signal indicative thereof. The first pulse control logic asserts the first PWM signal when the first set signal is asserted and de-asserts the first PWM signal when the first reset signal is asserted.

In one embodiment, the oscillator ramps the first leading-edge ramp signal down from a first voltage level beginning with each pulse of a clock signal, and the first ramp circuit ramps the first trailing-edge ramp signal up from a second voltage level while the first PWM signal is asserted.

The power converter may include a second phase circuit controlled by a second PWM signal for converting the input voltage to the output voltage via a second inductor coupled to the first inductor. In this case, the dual-edge modulation controller has a second PWM output for providing the second PWM signal, and includes third and fourth comparators, a second ramp circuit, and second pulse control logic. The oscillator provides a second leading-edge ramp signal having repetitive ramps. The third comparator compares the second leading-edge ramp signal with the compensation signal and asserts a second set signal indicative thereof. The second ramp circuit ramps a second trailing-edge ramp signal while the second PWM signal is asserted. The fourth comparator compares the second trailing-edge ramp signal with the compensation signal and asserts a second reset signal indicative thereof. The second pulse control logic asserts the second PWM signal when the second set signal is asserted and de-asserts the second PWM signal when the second reset signal is asserted.

In one embodiment, the first leading-edge ramp signal is synchronized with a first clock signal, the second leading-edge ramp signal is synchronized with a second clock signal, and the first and second clock signals are separated by a phase angle.

The power converter may further include a current balance system which adjusts the compensation signal based on sensed current of the first and second inductors. The current balance system may include first and second current balance circuits. The first current balance circuit receives the compensation signal and provides a first adjusted compensation signal to the second comparator. The second current balance circuit receives the compensation signal and provides a second adjusted compensation signal to the fourth comparator.

The first and second ramp circuits may generate the first and second trailing-edge ramp signals to have substantially equivalent slew rates. Alternatively, the first ramp circuit increases a slew rate of the first trailing-edge ramp signal while the second PWM signal is asserted and the second ramp circuit increases a slew rate of the second trailing-edge ramp signal while the first PWM signal is asserted. The power converter may include a pulse adder having first and second inputs receiving the first and second PWM signals and an output providing a phase number indicating a total number of PWM signals that are asserted at the same time. In this case, the first ramp circuit adjusts slew rate of the first trailing-edge ramp signal based on the phase number, and the second ramp circuit adjusts slew rate of the second trailing-edge ramp signal based on the phase number.

A method of controlling a DC-DC converter according to an embodiment of the present invention includes providing a first leading-edge ramp signal synchronous with a clock signal, comparing a feedback signal with a reference signal and providing a compensation signal indicative thereof, comparing the first leading-edge ramp signal with the compensation signal and asserting a first start signal indicative thereof, ramping a first trailing-edge ramp signal while a first PWM signal is asserted, comparing the first trailing-edge ramp signal with the compensation signal and asserting a first stop signal indicative thereof, and asserting the first PWM signal when the first start signal is asserted and de-asserting the first PWM signal when the first stop signal is asserted.

The method may include ramping the first leading-edge ramp signal down from a first voltage level beginning with each pulse of the clock signal, and ramping the first trailing-edge ramp signal up from a second voltage level beginning when the first PWM signal is asserted. The method may include switching a first end of an output inductor between polarities of an input voltage based on the first PWM signal to generate an output voltage at a second end of the output inductor, and controlling slew rate of the first trailing-edge ramp signal based on any combination of the input voltage, voltage of the first end of the output inductor, voltage across the output inductor, and current through the output inductor.

The method may include providing a second leading-edge ramp signal synchronous with the clock signal and out of phase with the first leading-edge ramp signal, comparing the second leading-edge ramp signal with the compensation signal and asserting a second start signal indicative thereof, ramping a second trailing-edge ramp signal while a second PWM signal is asserted, comparing the second trailing-edge ramp signal with the compensation signal and asserting a second stop signal indicative thereof, and asserting the second PWM signal when the second start signal is asserted and de-asserting the second PWM signal when the second stop signal is asserted.

The method may include controlling a first phase circuit of the DC-DC converter with the first PWM signal and controlling a second phase circuit of the DC-DC converter with the second PWM signal, where the first and second phase circuits are coupled together. The method may include sensing current of the first and second phase circuits and adjusting the compensation signal to balance current of the first and second phase circuits. The method may include adjusting the compensation signal based on sensed current to provide a first adjusted compensation signal, adjusting the compensation signal based on sensed current to provide a second adjusted compensation signal, comparing the first trailing-edge ramp signal with the first adjusted compensation signal, and comparing the first trailing-edge ramp signal with the second adjusted compensation signal. The method may include ramping the first trailing-edge ramp signal at a first slew rate and ramping the first trailing-edge ramp signal at a second slew rate which is substantially equivalent to the first slew rate. The method may include adjusting a slew rate of the first trailing-edge ramp signal when the second PWM signal is asserted, and adjusting a slew rate of the second trailing-edge ramp signal when the first PWM signal is asserted. The method may include adding the first and second PWM signals together.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
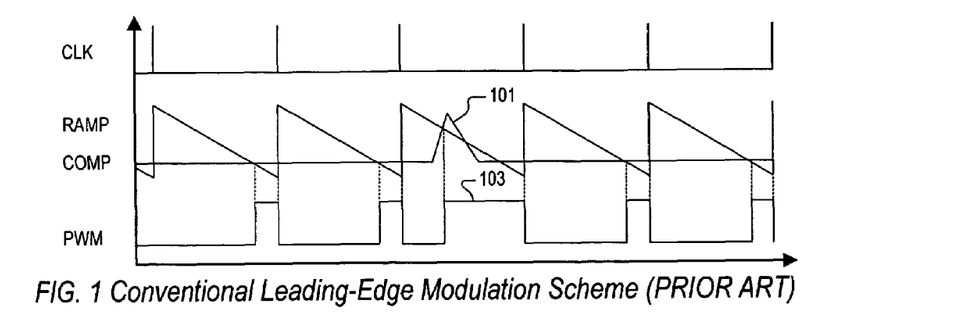
FIG. 1 is a series of timing diagrams illustrating a conventional leading-edge modulation scheme according to prior art.

FIG. 1 is a series of timing diagrams illustrating a conventional leading-edge modulation scheme. Clock (CLK) pulses are shown at the top, a sawtooth waveform signal RAMP and a compensation signal COMP are shown together in the middle and superimposed indicating their relative values, and a resulting pulse width modulation (PWM) signal is shown at bottom. The RAMP signal for this scheme exhibits repetitive negative-going ramps and is also known as a down ramp signal. In this scheme, the leading-edge (rising edge) of each pulse of the PWM signal is determined by the RAMP signal compared to the COMP signal, while the trailing-edge (falling edge) of each pulse of the PWM signal depends on the CLK signal. A load transient causes a corresponding transition on the COMP signal as shown at 101. The COMP transition 101 causes the PWM signal to turn on relatively quickly. The resulting PWM pulse 103 remains on, however, until the end of the current switching cycle occurring at the next CLK pulse, resulting in turn-off delay. This turn-off delay cause undesirable results, such as, for example, ringback, higher load-releasing voltage spike, etc., in an actual fast transient application, such as CPU VRM (Voltage Regulator Module) application.

Figure 2:
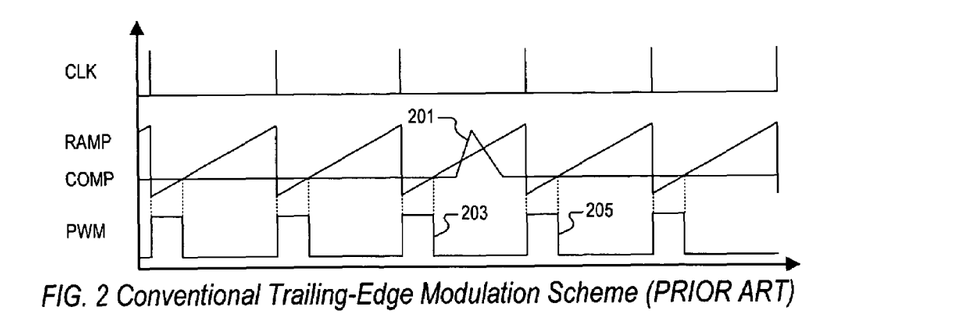
FIG. 2 is a series of timing diagrams illustrating a conventional trailing-edge modulation scheme according to prior art.

FIG. 2 is a series of timing diagrams illustrating a conventional trailing-edge modulation scheme. Again, the CLK pulses are shown at the top, the RAMP and COMP signals are shown superimposed in the middle, and the resulting PWM signal is shown at bottom. The RAMP signal for this scheme exhibits repetitive positive-going ramps and is also known as an up ramp signal. As shown, the CLK signal turns on each PWM pulse while the trailing-edge of each pulse of the PWM signal is determined by the RAMP signal compared to the COMP signal. A similar load transient causes a corresponding transition on the COMP signal as shown at 201. Once the prior PWM pulse 203 is turned off, however, the PWM signal stays in the off state until the end of the switching cycle at the next CLK pulse, resulting in turn-on delay. In this case, there is little or no response to the COMP transition 201 occurring after the trailing-edge and prior to the next rising edge of the PWM signal for the next pulse 205. This turn-on delay results in higher voltage spike during the load-applying transient event.

Figure 3:
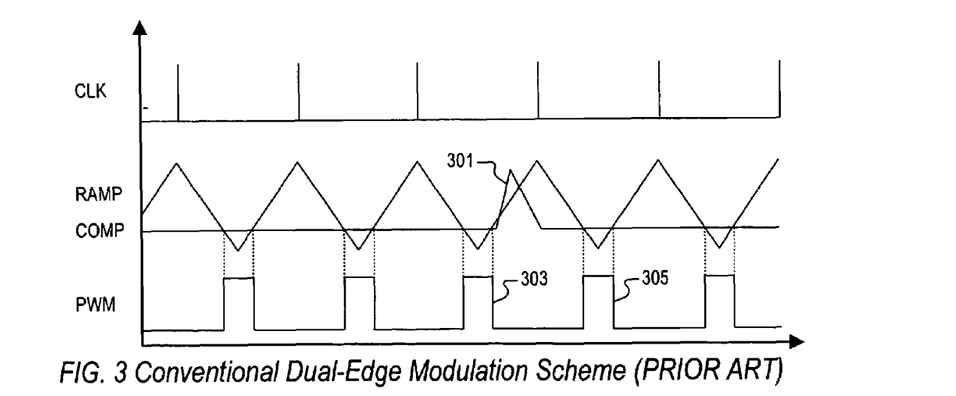
FIG. 3 is a series of timing diagrams illustrating a conventional dual-edge modulation scheme according to prior art.

FIG. 3 is a series of timing diagrams illustrating a conventional dual-edge modulation scheme. Again, the CLK pulses are shown at the top, the RAMP and COMP signals are shown superimposed in the middle, and the resulting PWM signal is shown at bottom. The RAMP for this scheme is symmetrical with repetitive positive- and negative-going ramps as known to those skilled in the art, where the voltage of the RAMP signal decreases in the first half cycle and increases in the second half cycle. The RAMP signal for the conventional dual-edge modulation scheme is "fixed" such that its frequency and slew rates of the rising and falling pulses are predetermined. In order to avoid multiple pulses in any one switching cycle, the leading-edge of each pulse of the PWM signal only occurs in the first half cycle, while the trailing-edge only occurs in the second half cycle. A similar load transient causes a corresponding transition on the COMP signal shown at 301. If the COMP transition 301 begins after the trailing-edge of a prior pulse 301 and ends before the following rising edge of the next pulse 305 of the PWM signal as shown, there still exists turn-on and turn-off delay. Such transitions are asynchronous relative to the RAMP signal.

Figure 4:
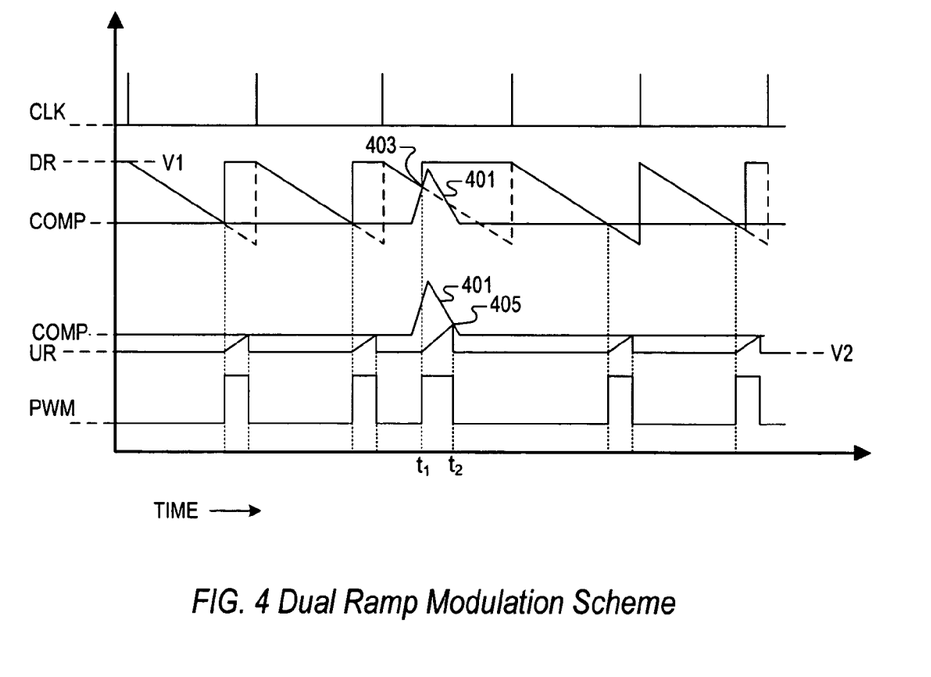
FIG. 4 is a series of timing diagrams illustrating a dual-edge modulation scheme using dual ramps according to an exemplary embodiment of the present invention.

FIG. 4 is a series of timing diagrams illustrating a dual-edge modulation scheme using dual ramps according to an exemplary embodiment of the present invention. In this case, the CLK pulses are shown at top, followed by a down ramp waveform signal DR superimposed with the COMP signal, followed by an up ramp waveform signal UR superimposed with the COMP signal, followed by the resulting PWM signal, all plotted versus TIME. The COMP signal is repeated and superimposed for the UR and DR signals to indicate the relative switching points of the PWM signal. As illustrated by the solid lines for the down ramp signal DR, for each CLK cycle the DR signal starts from its highest-level voltage V1 and decreases at a fixed rate upon the next pulse of the CLK signal and then returns to V1 when DR=COMP or when the next CLK pulse occurs. In this first embodiment, the DR signal stays at V1 for the remainder of the CLK cycle until CLK pulses again to begin the next CLK cycle. Alternatively, the DR ramp is shaped just like the conventional leading-edge modulation RAMP signal as shown by dashed lines and thus continues to ramp down until the next CLK pulse. When the DR signal becomes equal to COMP (or upon the next CLK pulse), the PWM signal is asserted high. The DR signal is thus a leading-edge ramp signal used to determine the leading-edge of each pulse of the PWM signal. The up ramp signal UR begins at a voltage V2 and ramps up beginning at the leading-edge of each PWM pulse, and stops ramping when UR=COMP. When the UR signal becomes equal to COMP, the PWM signal is de-asserted low and the UR signal returns to V2. The UR signal is thus a trailing-edge ramp signal used to determine the trailing-edge of each pulse of the PWM signal.

A similar load transient causes a corresponding transition on the COMP signal as shown at 401. When the COMP signal changes under the transient event as shown by the COMP transition 401, the COMP signal intersects the DR signal at a time t1 as shown at 403 to initiate the leading-edge of the PWM signal. In this manner, the PWM signal triggers sooner in the CLK cycle in a similar manner as for the leading-edge modulation scheme. In this case, however, the early triggering of the PWM signal also initiates the rising edge of the UR signal at time t1. The UR signal intersects the COMP signal relatively quickly at a time t2 as shown at 405 given that the COMP signal falls quickly, so that the PWM signal is deasserted at time t2.

The timing diagram illustrates that there is significantly less delay for both the on and off transitions of the PWM signal, so that the concerns and delays of the conventional PWM modulation schemes are avoided. In this manner, a dual-edge modulation scheme using dual ramps according to an exemplary embodiment of the present invention combines the benefits of the leading-edge and trailing-edge modulation schemes. The leading edge of each PWM pulse occurs when the leading-edge ramp signal intersects the COMP signal. The trailing-edge ramp signal starts ramping upon the leading-edge of each PWM pulse. The trailing edge of each PWM pulse occurs when the trailing-edge ramp signal intersects the COMP signal. In this manner, the start and stop points of each PWM pulse are both decoupled from the CLK signal so that the PWM pulse starts when needed, stops when needed, and has a duration properly based on the COMP signal rather than artificially based on the CLK signal.

Figure 5:
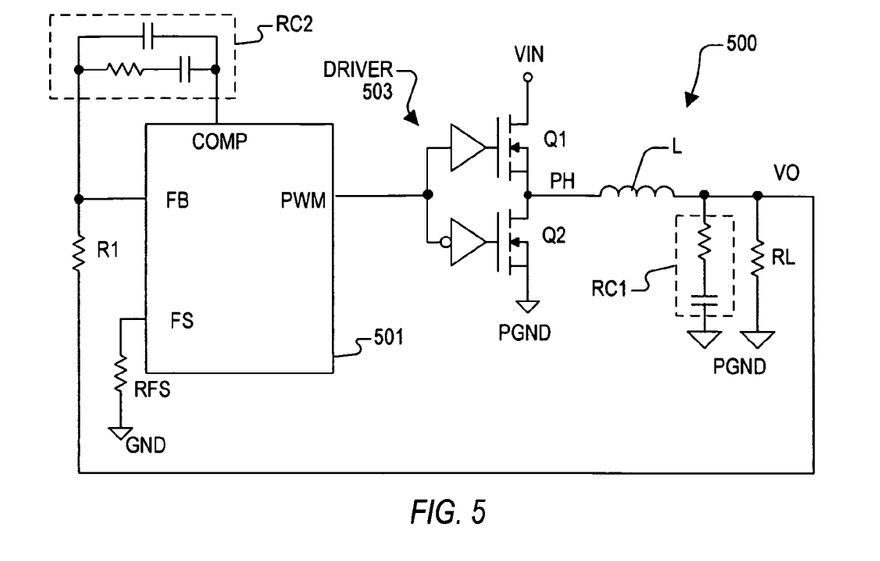
FIG. 5 is a block diagram of an exemplary DC-DC buck converter employing a single-phase voltage mode controller implemented according to an exemplary embodiment of the present invention.

FIG. 5 is a block diagram of an exemplary DC-DC buck converter 500 employing a single-phase voltage mode controller 501 implemented according to an exemplary embodiment of the present invention. The controller 501 has a PWM pin coupled to an input of a driver circuit 503, which drives the gates of electronic switches Q1 and Q2 having controlled current paths coupled between an input voltage VIN and power ground (PGND). The switches Q1, Q2 are designated with Q reference numbers and schematically shown as simplified representations of field-effect transistors (FETs), where it is understood that the switches Q1, Q2 may be implemented as any suitable electronic switching devices, such as N-channel devices, P-channel devices, metal-oxide semiconductor FETs (MOSFETs), bipolar-junction transistors (BJTs), insulated gate bipolar transistors (IGBTs), or any other electronic switch configuration as known to those skilled in the art. In this example, the drain of Q1 is coupled to VIN and its source is coupled to a phase node PH, which is coupled to the drain of Q2. The source of Q2 is coupled to PGND. A node and the signal it carries assume the same name unless otherwise specified. The PH node is coupled to one end of an output inductor L, having its other end coupled to an output voltage node VO (developing an output signal VO). VO is filtered by a resistor-capacitor circuit RC1 and provided across a load resistor RL coupled between VO and PGND. VO is fed back through a resistor R1 to a feedback pin FB of the controller 501. Another resistor-capacitor circuit RC2 is coupled between the FB pin and a compensation pin COMP of the controller 501. A frequency set resistor RFS is coupled between a frequency set pin FS of the controller 501 and signal ground (GND). As understood by those skilled in the art, Q1 is turned on while Q2 is off to couple VIN through the inductor L to develop the output signal VO, then Q1 is turned off and Q2 turned on to couple L to GND, and this switching process is repeated as controlled by the PWM output of the controller 501. The frequency of the clock signal generally controlling the PWM cycles is programmable within a certain range as determined by the resistor RFS.

Figure 6:
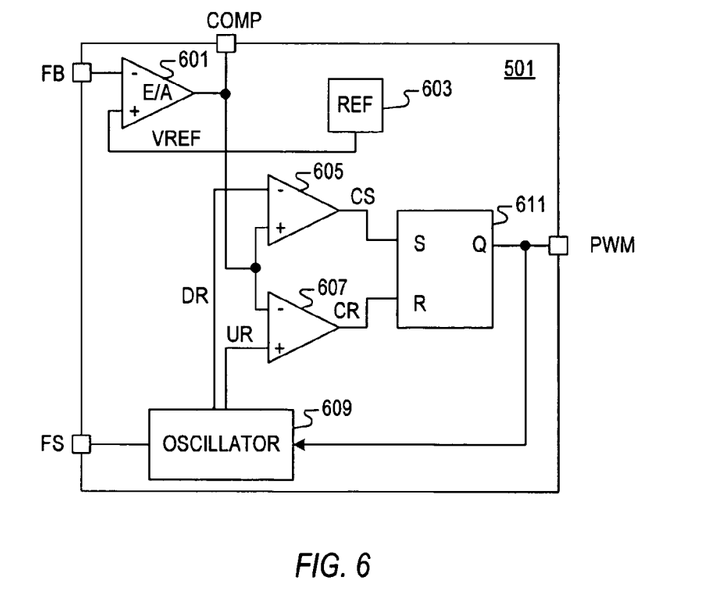
FIG. 6 is a simplified block diagram of an exemplary embodiment of the single-phase voltage mode controller of FIG. 5 implemented with a dual-edge modulation scheme using dual ramps according to an exemplary embodiment of the present invention.

FIG. 6 is a simplified block diagram of an exemplary embodiment of the single-phase voltage mode controller 501 implemented with a dual-edge modulation scheme using dual ramps according to an exemplary embodiment of the present invention. The FB pin is provided to the inverting (−) input of an error amplifier (E/A) 601, receiving a reference voltage VREF at its non-inverting (+) input provided by a reference circuit 603. The COMP pin is coupled to the output of the E/A 601, which is further coupled to the non-inverting (+) input of a first comparator 605 and to the inverting (−) input of another comparator 607. The FS pin is coupled to an oscillator circuit 609, having a first output providing the down ramp signal DR to the inverting input of the comparator 605 and a second output providing the up ramp signal UR to the non-inverting input of the comparator 607. The output of comparator 605, generating a "set" signal CS, is provided to the set input S of an R-S flip-flop 611 and the output of comparator 607, generating a "reset" signal CR, is provided to the reset input R of the R-S flip-flop 611. The Q output of the R-S flip-flop 611 generates the PWM signal provided to (and by) the PWM pin of the controller 501. The R-S flip-flop 611 operates as pulse control logic to control the state of the PWM signal based on the outputs of the comparators 605 and 607. The PWM signal is internally fed back to the oscillator circuit 609.

Figure 7:
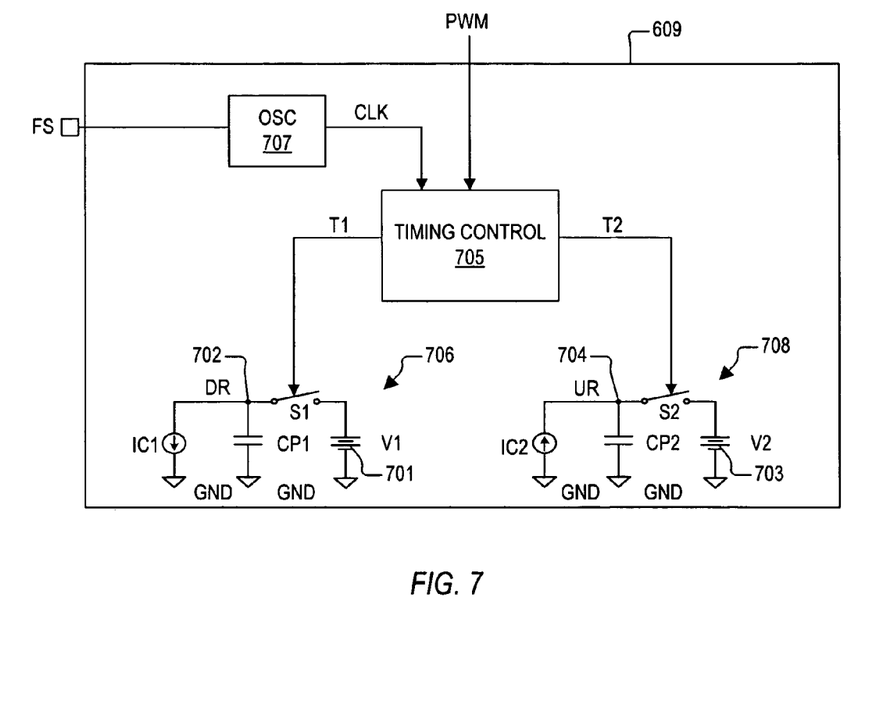
FIG. 7 is a simplified schematic and block diagram of an exemplary embodiment of the oscillator of FIG. 6.

FIG. 7 is a simplified schematic and block diagram of the oscillator circuit 609 according to an exemplary embodiment of the present invention. The oscillator circuit 609 includes a first ramp circuit 706 for generating the down ramp signal DR and a second ramp circuit 708 for generating the up ramp signal UR. For the first ramp circuit 706, a voltage source 701 provides the V1 voltage to one terminal of a single-pole, single-throw (SPST) switch S1, having its other terminal coupled to a node 702 that develops the DR signal provided to the comparator 605. Node 702 is coupled to one end of a capacitor CP1 and to the input of a current sink IC1. The other end of the capacitor CP1 and the output of the current sink IC1 are each coupled to GND. For the second ramp circuit 708, another voltage source 703 provides the V2 voltage to one terminal of another SPST switch S2, having its other terminal coupled to a node 704 that develops the UR signal provided to the comparator 607. Node 704 is coupled to one end of a capacitor CP2 and to the input of a current source IC2. The other end of the capacitor CP2 and the input of the current source IC2 are each coupled to GND. A timing control circuit 705 generates a first timing signal T1 provided to a control input of the switch S1 and a second timing signal T2 provided to a control input of the switch S2. The CLK signal, which is generated by an oscillator 707, is provided to the timing control circuit 705 and has a frequency determined by the externally-coupled resistor RFS as previously described. The PWM signal is provided to the timing control circuit 705 for controlling timing of the DR and UR ramp signals. In an alternative embodiment, the CS and CR signals may be used instead of the PWM signal.

The timing control circuit 705 asserts the T1 signal high to close switch S1 to reset the DR signal to the V1 voltage level. The timing control circuit 705 asserts the T1 signal low to open the switch S1, so that the current sink IC1 discharges the capacitor CP1 to create the negative-going ramp of the DR signal. In one embodiment, the timing control circuit 705 keeps the T1 signal low until the next pulse of the CLK signal so that the DR signal continues to ramp down, similar to conventional leading-edge modulation schemes, and then asserts the T1 signal high to close the switch S1 to reset DR back to the V1 voltage level to start the next CLK cycle. In an alternative embodiment, the timing control circuit 705 closes the switch S1 when the PWM signal goes high to reset the DR signal back to V1 earlier in the CLK cycle. If the DR signal resets prior to the next CLK pulse, then it is held until the next pulse of CLK.

The timing control circuit 705 asserts the T2 signal high to close switch S2 to reset the UR signal to the V2 voltage level. The timing control circuit 705 asserts the T2 signal low to open the switch S2, so that the current source IC2 charges the capacitor CP2 to create the positive-going ramp of the UR signal. The timing control circuit 705 controls the switch S2 via the T2 signal based on the PWM signal (or the CS and CR signals). When the PWM signal is low, the timing control circuit 705 closes the switch S2 via the T2 signal to keep the UR signal at V2. When the PWM signal is asserted high, the timing control circuit 705 opens the switch S2 via the T2 signal to allow IC2 to charge CP2 to generate the rising ramp of the UR signal.

Operation of the oscillator circuit 609, as controlled by the timing control circuit 705, is illustrated by the timing diagrams of FIG. 4 and the block diagram of FIG. 6. When the DR signal falls to the voltage level of the COMP signal, the CS signal is asserted high to set the R-S flip-flop 611 which asserts the PWM signal high. The timing control circuit 705 opens the switch S2 to initiate the rising slope of the UR signal. When the UR signal rises to the voltage level of the COMP signal, the CR signal is asserted high to reset the R-S flip-flop 611 which pulls the PWM signal back low. The timing control circuit 705 closes the switch S2 to reset the UR signal back to V2. The comparison of the DR signal with the COMP signal triggers assertion of the PWM signal, which in turn triggers the rising slope of the UR signal. The UR signal determines the duration of the PWM signal, which is pulled back low when the UR signal rises to the level of the COMP signal.

The slew rate of the UR signal is proportional to any selected combination of the input voltage VIN, the voltage of the PH node, the voltage across the output inductor L, or the peak, average, or instantaneous current through the output inductor L. The VIN and/or PH voltages may be directly fed to the controller 501 or indirectly determined through various sensing means. Many techniques are known for sensing the current of the output inductor L.

Figure 8:
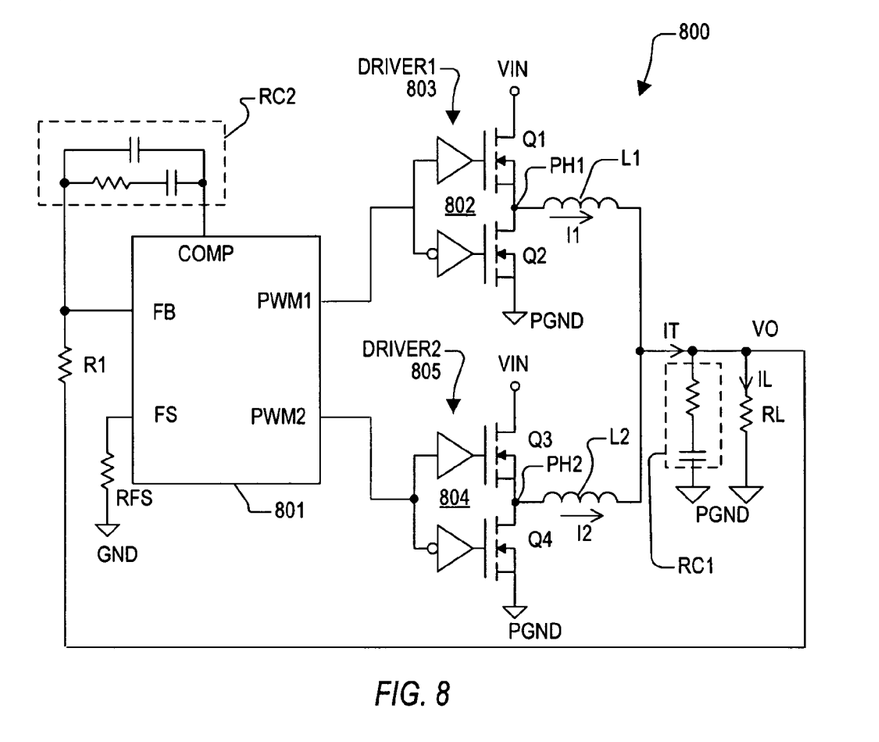
FIG. 8 is a block diagram of an exemplary DC-DC buck converter employing a two-phase voltage mode controller implemented according to an exemplary embodiment of the present invention.

FIG. 8 is a block diagram of an exemplary DC-DC buck converter 800 employing a two-phase voltage mode controller 801 implemented according to an exemplary embodiment of the present invention. The DC-DC buck converter 800 is similar to the DC-DC buck converter 500 and similar components or devices assume identical reference numerals. The two-phase voltage mode controller 801 is similar to the single-phase voltage mode controller 501 and includes the FS, FB and COMP pins. The controller 801, however, includes first and second PWM pins PWM1 and PWM2 for controlling first and second phase circuits 802, 804 of the two-phase system. The PWM1 pin of the controller 801 is coupled to an input of a first driver circuit 803 (DRIVER1) of the first phase circuit 802, where the first driver circuit 803 drives the gates of electronic switches Q1 and Q2 (of the first phase circuit 802) having controlled current paths coupled between an input voltage VIN and PGND. The driver circuit 803 and the switches Q1 and Q2 are configured and coupled to operate in substantially the same manner as the driver circuit 503 and the switches Q1 and Q2 of the DC-DC buck converter 500. The PWM2 pin of the controller 801 is coupled to an input of a second driver circuit 805 (DRIVER2) of the second phase circuit 804, where the second driver circuit 805 drives the gates of electronic switches Q3 and Q4 (of the second phase circuit 804) having controlled current paths coupled between an input voltage VIN and PGND. The driver circuit 805 and the switches Q3 and Q4 are also configured and coupled to operate in substantially the same manner as the driver circuit 503 and the switches Q1 and Q2 of the DC-DC buck converter 500. For the DC-DC buck converter 800, however, the source of Q1 and the drain of Q2 are coupled together at a first phase node PH1 and coupled to one end of a first output inductor L1 (of the first phase circuit 802). Likewise, the source of Q3 and the drain of Q4 are coupled together at a second phase node PH2 and coupled to one end of a second output inductor L2 (of the second phase circuit 804). The other ends of the output inductors L1 and L2 are coupled together at an output node developing the output signal VO.

The remaining portion of the DC-DC buck converter 800 is substantially identical to the DC-DC buck converter 500. In particular, VO is filtered by a resistor-capacitor circuit RC1 and provided across the load resistor RL coupled between VO and PGND. VO is fed back through a resistor R1 to the feedback pin FB of the controller 801. Another resistor-capacitor circuit RC2 is coupled between the FB pin and the compensation pin COMP of the controller 801. A frequency set resistor RFS is coupled between a frequency set pin FS of the controller 801 and GND. The frequency of the clock signal generally controlling the PWM cycles is programmable within a certain range as determined by the resistor RFS. The specific component values of RC1, RL, R1, RFS and RC2 may be modified as appropriate. As understood by those skilled in the art, each phase operates in substantially the same manner as described above for the DC-DC buck converter 500, except that the two phases are operated 180 degrees out of phase with respect to each other. The current through the output inductor L1 is shown as a first phase current I1, the current through the output inductor L2 is shown as a second phase current I2, and the total output current of both phases is shown as a total current IT flowing to the output node developing the VO signal. The current through the load resistor RL is shown as a load current IL.

Figure 9:
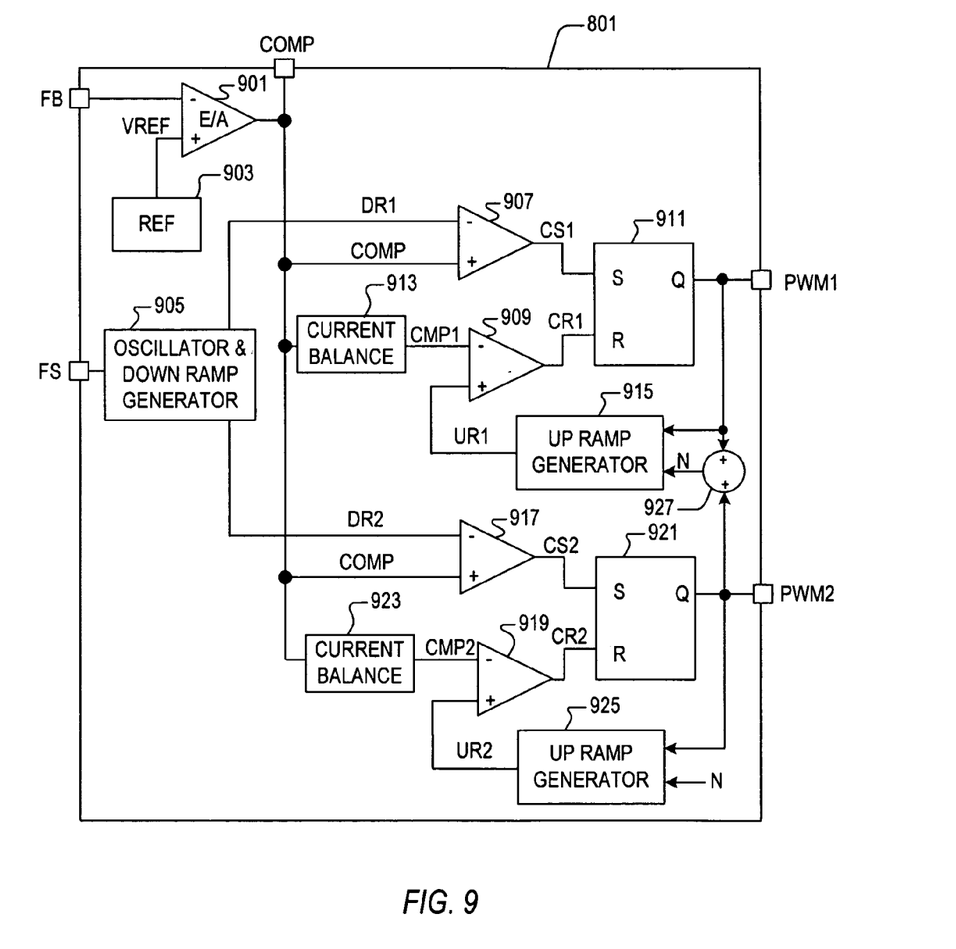
FIG. 9 is a simplified block diagram of an exemplary embodiment of the two-phase voltage mode controller of FIG. 8 implemented using dual ramp signals according to an exemplary embodiment of the present invention.

FIG. 9 is a simplified block diagram of an exemplary embodiment of the two-phase voltage mode controller 801 implemented using dual ramp signals according to an exemplary embodiment of the present invention. The FB pin is provided to the inverting input of an error amplifier (E/A) 901, receiving a reference voltage VREF at its non-inverting input provided by a reference circuit 903. The COMP pin is coupled to the output of the E/A 901 (providing the COMP signal), which is further coupled to the non-inverting inputs of a first comparator 907 and another comparator 917, and to the inputs of current balance circuits 913 and 923. The FS pin is coupled to an oscillator and down ramp generator circuit 905, having a first output providing a first down ramp signal DR1 to the inverting input of the comparator 907 and a second output providing a second down ramp signal DR2 to the inverting input of the comparator 917. The output of the current balance circuit 913 provides a first adjusted compensation signal CMP1 which is provided to the inverting input of another comparator 909. The output of the current balance circuit 923 provides a second adjusted compensation signal CMP2 which is provided to the inverting input of another comparator 919. The output of comparator 907, generating a first set or "start" signal CS1, is provided to the set input S of a first R-S flip-flop 911. The output of comparator 909, generating a first reset or "stop" signal CR1, is provided to the reset input R of the R-S flip-flop 911. The output of comparator 917, generating a second set or start signal CS2, is provided to the set input S of a second R-S flip-flop 921. The output of comparator 919, generating a second reset or stop signal CR2, is provided to the reset input R of the R-S flip-flop 921.

The Q output of the R-S flip-flop 911 generates the PWM1 signal provided to (and by) the PWM1 pin of the controller 801, and the Q output of the R-S flip-flop 921 generates the PWM2 signal provided to (and by) the PWM2 pin of the controller 801. The PWM1 and PWM2 signals are provided to respective inputs of a pulse adder 927, having an output providing a phase number or pulse count signal "N" to a first input of a first up ramp generator 915, having a second input receiving the PWM1 signal. The up ramp generator 915 has an output coupled to the non-inverting input of the comparator 909 for providing a first up ramp signal UR1. The N signal and the PWM2 signal are provided to respective inputs of a second up ramp generator 925, having an output coupled to the non-inverting input of the comparator 919 for providing a second up ramp signal UR2. In the embodiment illustrated, N is an integer number determining the total number of PWM signals that are turned on at the same time (or representing the total number of active phases). Thus, the pulse adder 927 outputs N=0 when PWM1 and PWM2 are both low, N=1 when either one but not both of the PWM1 and PWM2 signals is high, and N=2 when both of the PWM1 and PWM2 signals are high.

The current balance circuits 913 and 923 collectively form a current balance system in which each operates to adjust the COMP signal based on the total current IT of both phases and the corresponding phase current of the respective phase I1 or I2. In one embodiment, the output of the current balance circuit 913 is COMP+k*(I2−I1) for phase 1, where "k" is a constant gain factor, I1 is the current of phase 1 (through output inductor L1), and the asterisk "*" denotes multiplication. Likewise, the output of the current balance circuit 923 is COMP+k*(I1−I2) for phase 2, where I2 is the current of phase 2 (through output inductor L2). The respective current signals may be sensed using any of a number of methods known to those skilled in the art. In this embodiment, when I1 and I2 are equal to each other, the current balance circuits 913 and 923 have no impact on the operation.

Figure 10:
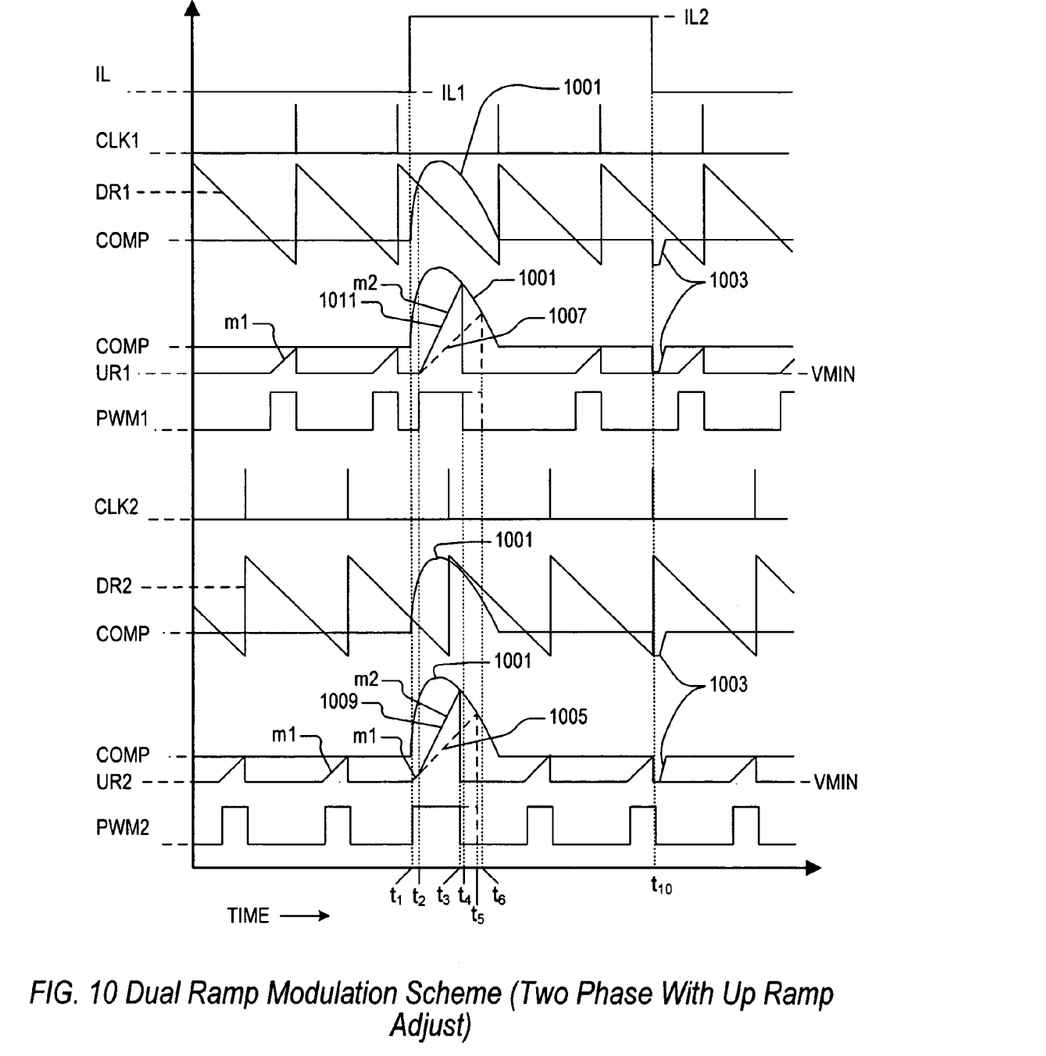
FIG. 10 is a series of timing diagrams illustrating exemplary operation of the two-phase voltage mode controller of FIG. 9 according to several embodiments of the present invention.

FIG. 10 is a series of timing diagrams illustrating exemplary operation of the two-phase voltage mode controller 801 according to several embodiments of the present invention. The operation of the current balance circuits 913 and 923 are ignored to simplify the explanation of the operation for the multiphase case. The IL current is shown at top, followed by a first clock signal CLK1, followed by the first down ramp signal DR1 superimposed with the COMP signal, followed by the first up ramp signal UR1 superimposed with the COMP signal, followed by the first phase PWM1 signal, followed by a second clock signal CLK2, followed by the second down ramp signal DR2 superimposed with the COMP signal, followed by the second up ramp signal UR2 superimposed with the COMP signal, followed by the second phase PWM2 signal, all plotted versus TIME. The COMP signal is repeated and superimposed for the UR1, UR2, DR1 and DR2 signals to indicate the relative switching points for the PWM1 and PWM2 signals. The UR1 and UR2 signals start at an initial voltage level VMIN. The oscillator and down ramp generator circuit 905 internally generates the first and second clock signals CLK1 and CLK2 having pulses that are 180 degrees out of phase. The first down ramp signal DR1 is synchronized with the CLK1 signal and the second down ramp signal DR2 is synchronized with the CLK2 signal. The DR1 and DR2 signals generally have the same form and slew rate. The slew rates are configured to be as close as possible and thus are considered substantially equivalent. The IL current steps up from a lower current level IL1 to a higher current level IL2 at a time t1, representing a load transient which causes a corresponding transition on the COMP signal as shown at 1001. The IL current drops back down to IL1 at a subsequent time t10 causing a slight dip of the COMP signal shown at 1003.

In a first embodiment, the up ramp signals UR1 and UR2 have the same general form and slew rate (substantially equivalent) m1 and as illustrated with dashed lines. At time t1, the transition 1001 of the COMP signal rises very quickly at about the time when the DR2 signal has decreased almost to the original level of the COMP signal. Thus, at about time t1, COMP rises to intersect DR2 causing the comparator 917 to switch to pull the CS2 signal high, which sets the R-S flip-flop 921 and pulls the PWM2 signal high at time t1. The COMP rises to DR1 shortly after time t1 at a time t2, switching the comparator 907. The comparator 907 pulls the CS1 signal high, which sets the R-S flip-flop 907 and pulls the PWM1 signal high at time t2. In the first embodiment, the UR2 signal continues to rise with slew rate m1 as shown at 1005 until it intersects the COMP signal at a subsequent time t5, which is transitioning downwards at this time. When the UR2 signal rises to COMP at time t5, the comparator 919 asserts the CR2 signal high to reset the R-S flip-flop 921, which pulls the PWM2 signal low at time t5. Shortly thereafter, the UR1 signal rises to COMP at time t6, causing the comparator 909 to assert the CR1 signal to reset the R-S flip-flop 911 to pull the PWM1 signal low at time t6.

The timing diagram of FIG. 10 illustrates the general principles of the dual ramp system applied to two phases. Each phase exhibits significantly less delay for both the on and off transitions of the corresponding PWM signal, so that the concerns and delays of the conventional PWM modulation schemes are avoided. Although only two phases are shown, it is now appreciated by those skilled in the art that any practical number of phases may be implemented. The phases are operated at corresponding phase angle offsets relative to each other. For four phases, for example, the phases are operated 90 degrees out of phase with respect to each other. In this manner, a dual ramp modulation scheme according to an exemplary embodiment of the present invention combines the benefits of the leading-edge and trailing-edge modulation schemes for a power converting with any number of phases.

It is appreciated that regardless of when the load transient occurs, at least one phase responds very quickly, and depending on the duration of the transition, multiple phases respond to handle the load increase quickly and efficiently with significantly reduced delay. As shown above for the two-phase case, both phases respond relatively quickly to the transition 1001 so that both PWM pulses are on at the same time for most of the duration of the transition 1001. Since both phases are active at the same time, it may be desired to reduce the turn off the PWM1 and PWM2 pulses sooner in some embodiments to reduce any possibility of ring-back or voltage spikes or the like. In a second embodiment illustrated using solid lines, the slew rates of the UR1 and UR2 signals are both increased based on the number of PWM pulses simultaneously active as indicated by the N signal output from the pulse adder 927. At time t1, the PWM2 signal is high and the PWM1 signal is still low, so that the UR2 signal begins to rise at the usual slew rate m1. At time t2, however, the PWM1 signal is also pulled high so that both PWM1 and PWM2 are high at the same time. In the second embodiment, the slew rate of the UR2 signal is increased to m2 as shown at 1009. And since PWM1 goes high when PWM2 is already high, the UR1 signal rises with slew rate m2 as shown at 1011. The UR2 signal rises to COMP early at a time t3 before time t5. And the UR2 signal rises to COMP early at time t4 before time t6. In this manner, the slew rates of the UR1 and UR2 signals are adjusted (e.g., increased) based on the total number of PWM signal active at the same time.

Figure 11:
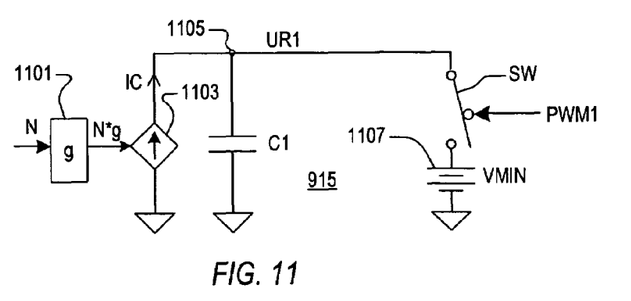
FIG. 11 is a simplified block diagram of the up ramp generator of FIG. 10 according to an exemplary embodiment of the present invention.

FIG. 11 is a simplified block diagram of the up ramp generator 915 according to an exemplary embodiment of the present invention. The up ramp generator 925 is configured in substantially the same manner and is not further described. The N signal is provided to a gain circuit 1101 which multiplies N by a gain factor "g" and outputs the value N*g to a control input of a controlled current source 1103. The current source 1103 has an input coupled to GND and an output coupled to a node 1105 developing the up ramp signal UR1. Node 1105 is coupled to one end of a capacitor C1 and to one terminal of a SPST switch SW. The other end of the capacitor C1 is coupled to GND and the second terminal of the switch SW is coupled to the positive terminal of a voltage source 1107 developing the VMIN voltage. The negative terminal of the voltage source 1107 is coupled to GND. The switch SW has an inverted control terminal receiving the PWM1 signal.

In operation, when the PWM1 signal is low, the switch SW is closed and the UR1 signal is pulled down to the voltage level VMIN. Recall in FIG. 10 that when the PWM1 signal is low, the UR1 signal is reset back to VMIN. When the PWM1 signal is pulled high, it opens the switch SW, so that the current source 1103 generates a charge current IC to charge the capacitor C1. While the switch SW is opened, the voltage of UR1 increases based on the magnitude of IC. The magnitude of IC is a predetermined nominal value multiplied by the factor N*g. For N=1, the slew rate of UR1 is m1 and when N=2, the slew rate of UR1 is m2 as previously described. In the embodiment illustrated, m2 is twice that of m1. Although not shown, another, higher voltage supply may be included and coupled to the node 1105 via a diode or the like to limit the voltage level of UR1 to a predetermined maximum level.

The current balance circuits 913 and 923 operate to divide the load current as evenly as practical amongst the phases. The current balance circuits receive signals that represent the current in each phase and appropriately filters and otherwise processes the input signals to generate current balance signals which are proportional to the deviation of the current in each phase from the average current of all phases. These current balance signals are combined as an offset term in the calculation of the difference between a fixed reference and the COMP signal used to determine the duration of the time intervals for each respective phase. The effect of the current balance circuits is to drive all phase currents toward each other in a closed loop method. Because of the closed loop nature of the circuit, provided that all phases are treated equally, the offsets can be handled in a bipolar manner or can be truncated or offset to produce strictly a positive or a negative offset.

Figure 12:
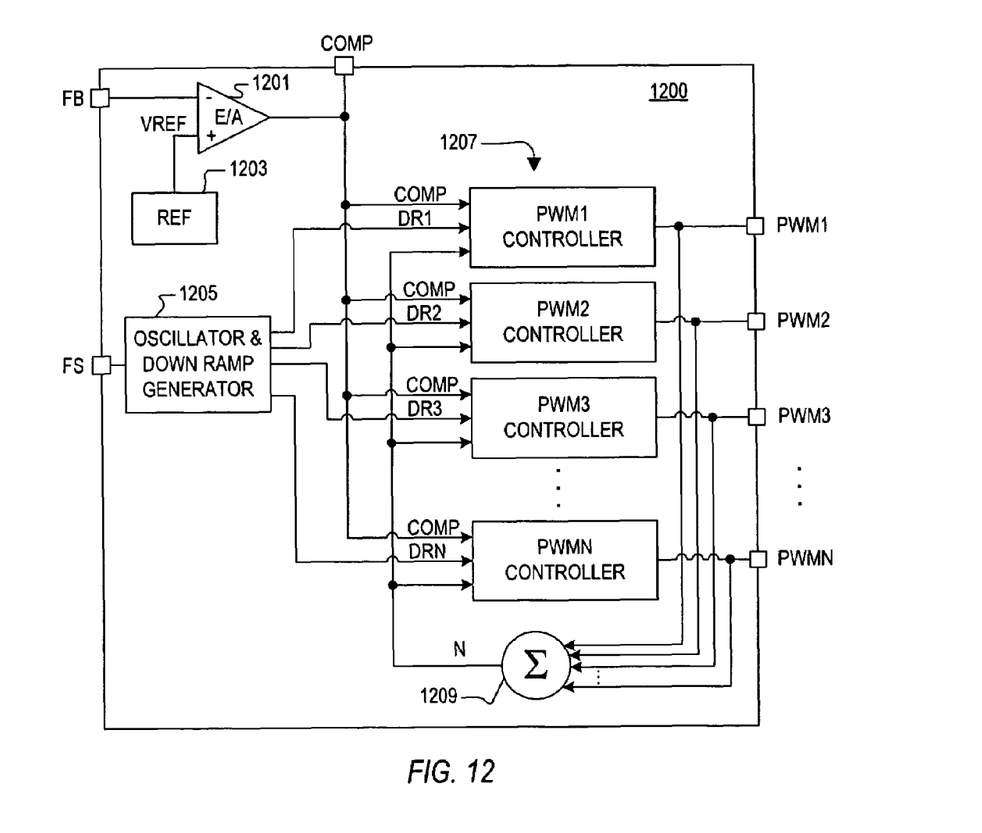
FIG. 12 is a simplified block diagram of an exemplary embodiment of an N-phase voltage mode controller implemented using dual ramp signals according to an exemplary embodiment of the present invention.

FIG. 12 is a simplified block diagram of an exemplary embodiment of an N-phase voltage mode controller 1200 implemented using dual ramp signals according to an exemplary embodiment of the present invention. The N-phase voltage mode controller 1200 is similar in configuration and operation to the two-phase voltage mode controller 801 except generalized to control up to "N" phases in which N is any positive integer greater than 0 (and can be used to control a single phase if desired). The controller 1200 includes the FS, FB and COMP pins in a similar manner as the controller 801. The controller 1200 includes an E/A 1201 (similar to the E/A 901) having its inverting input coupled to the FB pin and its non-inverting input receiving a reference voltage VREF. VREF is provided by a reference circuit 1203 (similar to the reference circuit 903). The output of E/A 1201 provides the COMP signal which is further provided to the COMP pin and to each of N PWM controllers 1207, individually labeled PWM1 controller, PWM2 controller, PWM3 controller, . . . , PWMN controller. The PWM controllers 1207 each have an output providing a corresponding one of N PWM signals PWM1-PWMN provided to corresponding pins PWM1-PWMN. The PWM1-PWMN signals are also provided to respective inputs of a pulse adder 1209, having an output providing the N phase number signal to each of the PWM controllers 1207. The pulse adder 1209 operates in a similar manner as the pulse adder 927 except adding up to N simultaneously active PWM pulses. The oscillator and down ramp generator circuit 905 is replaced with a similar oscillator and down ramp generator circuit 1205 having an input coupled to the FS pin and N outputs providing corresponding down ramp signals DR1, DR2, DR3, . . . , DRN, where each down ramp signal DR1-DRN is provided to a corresponding one of the N PWM controllers 1207.

The generator circuit 1205 operates in a similar manner as the generator circuit 905 except that it separates the down ramp signals by the appropriate nominal phase angles depending upon the number of active or selected phases in operation. For example, for two phases the two down ramp signals DR1 and DR2 are separated by 180 degrees (e.g., 0, 180), for four phases the four down ramp signals DR1, DR2, DR3 and DR4 are separated by 90 degrees (e.g., 0, 90, 180, 270), for six phases the six down ramp signals DR1-DR6 are separated by 60 degrees (e.g., 0, 60, 120, 180, 240, 320), and so on. Each PWM controller 1207 includes a current balance circuit (e.g., similar to 913) receiving the COMP signal and providing a corresponding modified compensation signal, an up ramp generator (e.g., similar to 915) having inputs receiving the N phase number signal and a corresponding PWM signal and an output providing a corresponding up ramp signal, a first comparator (e.g., similar to 907) comparing a corresponding down ramp signal with the COMP signal and providing a set signal, a second comparator (e.g., similar to 909) comparing the corresponding modified compensation signal with the corresponding up ramp signal and providing a reset signal, and PWM logic (e.g., similar to R-S flip-flop 911) receiving the set and reset signals and providing the corresponding PWM signal. The slew rate of each up ramp signal of each phase is adjusted by the total number of PWM pulse signals that are turned on at the same time as determined by the N phase number signal provided by the pulse adder 1209.

Although the present invention has been described in considerable detail with reference to certain preferred versions thereof, other versions and variations are possible and contemplated. For example, the ramps and comparators can be inverted, the signals can be copied and offset for purposes of realization, the control method can be mapped into an equivalent digital control scheme, etc. The present invention is applicable to a number of synchronous and asynchronous switching regulator topologies. Further, the polarities can be interchanged for negative voltage regulators. Those skilled in the art should appreciate that they can readily use the disclosed conception and specific embodiments as a basis for designing or modifying other structures for providing out the same purposes of the present invention without departing from the spirit and scope of the invention as defined by the following claims.

What is claimed is:

1. A dual-edge modulation controller, comprising:
   a first ramp circuit which provides a leading-edge ramp signal synchronous with a clock signal;
   an error amplifier which compares a feedback signal with a reference signal and which provides a compensation signal indicative thereof;
   a first comparator which compares said leading-edge ramp signal with said compensation signal and which asserts a set signal indicative thereof;
   a second ramp circuit which provides a trailing-edge ramp signal that begins ramping when said set signal is asserted;
   a second comparator which compares said trailing-edge ramp signal with said compensation signal and which asserts a reset signal indicative thereof; and
   pulse control logic which asserts a pulse-width modulation (PWM) signal when said set signal is asserted and de-asserts said PWM signal when said reset signal is asserted.

2. The dual-edge modulation controller of claim 1, wherein said first ramp circuit ramps said leading-edge ramp signal from a first voltage level beginning with each pulse of said clock signal.

3. The dual-edge modulation controller of claim 1, wherein said second ramp circuit ramps said trailing-edge ramp signal from a first voltage level beginning when said PWM signal is asserted and which resets said trailing-edge ramp signal back to said first voltage level when said PWM signal is de-asserted.

4. The dual-edge modulation controller of claim 1, wherein said first ramp circuit is a down ramp generator and wherein said second ramp circuit is an up ramp generator.

5. The dual-edge modulation controller of claim 1, wherein said pulse control logic comprises an R-S flip-flop.

6. The dual-edge modulation controller of claim 1, wherein said PWM signal controls a switching circuit coupled to an output inductor at a phase node to convert an input voltage to an output voltage through the output inductor, and wherein said second ramp circuit controls slew rate of said trailing-edge ramp signal based on any combination of the input voltage, phase node voltage, voltage across the output inductor, and current through the output inductor.

7. A power converter, comprising:
a first phase circuit controlled by a first pulse width modulation (PWM) signal for converting an input voltage to an output voltage via a first inductor; and
a dual-edge modulation controller having a feedback input for sensing said output voltage and a first PWM output for providing said first PWM signal, said dual-edge modulation controller comprising:
an error amplifier having a first input coupled to said feedback input, a second input receiving a reference voltage and an output providing a compensation signal;
an oscillator which provides a first leading-edge ramp signal having repetitive ramps;
a first comparator which compares said first leading-edge ramp signal with said compensation signal and which asserts a first set signal indicative thereof;
a first ramp circuit which ramps a first trailing-edge ramp signal while said first PWM signal is asserted;
a second comparator which compares said first trailing-edge ramp signal with said compensation signal and which asserts a first reset signal indicative thereof; and
first pulse control logic which asserts said first PWM signal when said first set signal is asserted and which de-asserts said first PWM signal when said first reset signal is asserted.

8. The power converter of claim 7, wherein:
said oscillator ramps said first leading-edge ramp signal down from a first voltage level beginning with each pulse of a clock signal; and
wherein said first ramp circuit ramps said first trailing-edge ramp signal up from a second voltage level while said first PWM signal is asserted.

9. The power converter of claim 7, further comprising:
a second phase circuit controlled by a second PWM signal for converting said input voltage to said output voltage via a second inductor coupled to said first inductor; and
wherein said dual-edge modulation controller has a second PWM output for providing said second PWM signal, and wherein said dual-edge modulation controller further comprises:
said oscillator providing a second leading-edge ramp signal having repetitive ramps;
a third comparator which compares said second leading-edge ramp signal with said compensation signal and which asserts a second set signal indicative thereof;
a second ramp circuit which ramps a second trailing-edge ramp signal while said second PWM signal is asserted;
a fourth comparator which compares said second trailing-edge ramp signal with said compensation signal and which asserts a second reset signal indicative thereof; and
second pulse control logic which asserts said second PWM signal when said second set signal is asserted and which de-asserts said second PWM signal when said second reset signal is asserted.

10. The power converter of claim 9, wherein said first leading-edge ramp signal is synchronized with a first clock signal, wherein said second leading-edge ramp signal is synchronized with a second clock signal, and wherein said first and second clock signals are separated by a phase angle.

11. The power converter of claim 9, further comprising a current balance system which adjusts said compensation signal based on sensed current of said first and second inductors.

12. The power converter of claim 11, wherein said current balance system comprises a first current balance circuit receiving said compensation signal and providing a first adjusted compensation signal to said second comparator and a second current balance circuit receiving said compensation signal and providing a second adjusted compensation signal to said fourth comparator.

13. The power converter of claim 11, wherein said first and second ramp circuits generate said first and second trailing-edge ramp signals to have substantially equivalent slew rates.

14. The power converter of claim 11, wherein said first ramp circuit increases a slew rate of said first trailing-edge ramp signal while said second PWM signal is asserted and wherein said second ramp circuit increases a slew rate of said second trailing-edge ramp signal while said first PWM signal is asserted.

15. The power converter of claim 11, further comprising:
a pulse adder having first and second inputs receiving said first and second PWM signals and an output providing a phase number indicating a total number of PWM signals that are asserted at the same time;
wherein said first ramp circuit adjusts slew rate of said first trailing-edge ramp signal based on said phase number; and
wherein said second ramp circuit adjusts slew rate of said second trailing-edge ramp signal based on said phase number.

16. A method of controlling a DC-DC converter, comprising:
providing a first leading-edge ramp signal synchronous with a clock signal;
comparing a feedback signal with a reference signal and providing a compensation signal indicative thereof;
comparing the first leading-edge ramp signal with the compensation signal and asserting a first start signal indicative thereof;
ramping a first trailing-edge ramp signal while a first pulse-width modulation (PWM) signal is asserted;
comparing the first trailing-edge ramp signal with the compensation signal and asserting a first stop signal indicative thereof; and
asserting the first PWM signal when the first start signal is asserted and de-asserting the first PWM signal when the first stop signal is asserted.

17. The method of claim 16, wherein said providing a first leading-edge ramp signal comprises ramping the first leading-edge ramp signal down from a first voltage level beginning with each pulse of the clock signal, and wherein said ramping a first trailing-edge ramp signal comprises ramping the first trailing-edge ramp signal up from a second voltage level beginning when the first PWM signal is asserted.

18. The method of claim 16, further comprising:
switching a first end of an output inductor between polarities of an input voltage based on the first PWM signal to generate an output voltage at a second end of the output inductor; and
controlling slew rate of the first trailing-edge ramp signal based on any combination of the input voltage, voltage of the first end of the output inductor, voltage across the output inductor, and current through the output inductor.

19. The method of claim 16, further comprising:
providing a second leading-edge ramp signal synchronous with the clock signal and out of phase with the first leading-edge ramp signal;
comparing the second leading-edge ramp signal with the compensation signal and asserting a second start signal indicative thereof;
ramping a second trailing-edge ramp signal while a second PWM signal is asserted;
comparing the second trailing-edge ramp signal with the compensation signal and asserting a second stop signal indicative thereof; and
asserting the second PWM signal when the second start signal is asserted and de-asserting the second PWM signal when the second stop signal is asserted.

20. The method of claim 19, the DC-DC converter comprising first and second phase circuits coupled together, further comprising:
controlling the first phase circuit with the first PWM signal and controlling the second phase circuit with the second PWM signal;
sensing current of the first and second phase circuits; and
adjusting the compensation signal to balance current of the first and second phase circuits.

21. The method of claim 20, wherein said adjusting the compensation signal comprises:
adjusting the compensation signal based on sensed current to provide a first adjusted compensation signal;
adjusting the compensation signal based on sensed current to provide a second adjusted compensation signal;
said comparing the first trailing-edge ramp signal with the compensation signal comprising comparing the first trailing-edge ramp signal with the first adjusted compensation signal; and
said comparing the second trailing-edge ramp signal with the compensation signal comprising comparing the first trailing-edge ramp signal with the second adjusted compensation signal.

22. The method of claim 19, wherein said ramping a first trailing-edge ramp signal comprises ramping the first trailing-edge ramp signal at a first slew rate and wherein said ramping a second trailing-edge ramp signal comprises ramping the first trailing-edge ramp signal at a second slew rate which is substantially equivalent to the first slew rate.

23. The method of claim 19, further comprising:
adjusting a slew rate of the first trailing-edge ramp signal when the second PWM signal is asserted; and
adjusting a slew rate of the second trailing-edge ramp signal when the first PWM signal is asserted.

24. The method of claim 23, further comprising adding the first and second PWM signals.

* * * * *